United States Patent
Douglas et al.

(10) Patent No.: US 6,559,792 B1
(45) Date of Patent: May 6, 2003

(54) TEST CIRCUIT AND TEST METHOD FOR A PULSE DOPPLER RADAR SENSOR

(75) Inventors: Allan Scott Douglas, Tyngsboro, MA (US); Peter Anthony Volckman, Milton Keynes (GB)

(73) Assignee: M/A-Com Inc., Lowell, MA (US)

( * ) Notice: Subject to any disclaimer, the term of this patent is extended or adjusted under 35 U.S.C. 154(b) by 0 days.

(21) Appl. No.: 10/091,786

(22) Filed: Mar. 6, 2002

(51) Int. Cl.$^7$ .................................................. G01S 7/40
(52) U.S. Cl. ........................................ 342/173; 342/165
(58) Field of Search ................................. 342/165, 173, 342/174

(56) References Cited

U.S. PATENT DOCUMENTS

| | | | | |
|---|---|---|---|---|
| 4,065,769 A | * | 12/1977 | Pacozzi | 342/165 |
| 4,598,294 A | * | 7/1986 | Guhse | 342/170 |
| 4,945,360 A | * | 7/1990 | Trummer et al. | 342/165 |
| 5,543,801 A | * | 8/1996 | Shawyer | 342/174 |
| 5,886,663 A | * | 3/1999 | Broxon et al. | 342/165 |

* cited by examiner

Primary Examiner—Ian J. Lobo

(57) ABSTRACT

A method for testing a pulse Doppler radar sensor circuit comprising at least one antenna, and a switch circuit, comprising the steps of 1) configuring said switch circuit such that a first path between an input terminal and a first output terminal and a second path between an input terminal and a second output terminal introduce different phase delays to an input signal, 2) providing an input signal to the switch circuit at said input terminal, and 3) comparing a signal at the first output terminal and a signal at the second output terminal to determine if the sensor circuit is functioning.

33 Claims, 2 Drawing Sheets

TEST CIRCUIT AND TEST METHOD FOR A PULSE DOPPLER RADAR SENSOR

FIELD OF THE INVENTION

The present invention relates, in general, to fault detection within a circuit, and more specifically relates to testing the circuitry used in a 77 GHz pulse Doppler radar sensor.

BACKGROUND OF THE INVENTION

Vehicular radar systems have been developed for the automotive industry that provide a useful feedback as to the location and velocity of potential hazards. One such hazard discrimination system commonly found today uses a 77 GHz pulse Doppler radar sensor to identify and locate potential road hazards. Information from the radar sensor can be used to create a smart cruise control system that can automatically adjust to the conditions or hazards identified by the radar sensor.

Systems such as these utilize a small radar sensor module, usually about 4" in diameter, that is mounted somewhere on the front of the host automobile (e.g., behind the front grill). The module contains one or more antennas for transmitting and receiving radar signals. These devices work by transmitting short pulses (approximately 36 nanoseconds) of 77 GHz energy. The pulse is then reflected back from any objects in its path. By measuring the time from transmission until the reflected wave is received, the distance and velocity of the object (in this case, another vehicle on the road) from the sensor can be calculated.

This technique is useful for determining only the distance and velocity of the object relative to the sensor. However, in order for the system to work properly, it is necessary to determine not only the distance to the object and velocity of the object, but also the radial location of the object relative to the vehicle. For example, it is important to know if the other vehicle is directly in front of the automobile, or if it is in a lane to the left or a lane to the right of the vehicle. In order to make such a determination, the radar sensor uses a plurality of beams, radiating at different horizontal angles, from the same antenna. Each beam is selected sequentially for the transmission and reception of pulse energy. By comparing the time difference from each of the reflected signals, the location of the object relative to the sensor can be calculated by using digital signal processing techniques. The sensor commonly used in such applications contains a series of three antenna switches to select the separate antenna feeds that form the three beams. Each antenna beam has a width of approximately 3 degrees. It has been determined that this beam width corresponds with the approximate width of a lane of traffic. Thus, by using the three separate signals, it is possible to check for the presence of vehicles in the same lane as the host vehicle or in one lane to either side of the host vehicle.

While pulse Doppler radar systems such as the one described above are useful in determining the location of other vehicles on the road, it is difficult to determine when a problem exists in the system that prevents it from operating. The output of a non-functioning system could be mistaken for an indication that no vehicles are present. Thus, it is important to know if the radar detection system can be relied upon.

In the prior art, system diagnostics were performed by using various detector circuits added to the 77 GHz pulse Doppler radar circuit. The only components of the system that were normally monitored was the input oscillator. This was accomplished by measuring the current drawn by the 77 GHz InP Gunn diode source. However, the 77 GHz InP Gunn source is no longer used in most 77 GHz pulse Doppler radar circuits as the input source. The 77 GHz InP source has been replaced with monolithic microwave integrated circuit chips (MMIC) that generate a 77 GHz input signal. As a result, the current monitoring technique used in the prior art can not be used in systems where the 77 GHz InP Gunn source has been replaced with MMIC technology.

An additional shortcoming of the existing fault detection process is that the current monitoring process can only detect a failure with respect to the InP Gunn 77 GHz input source. The current monitoring method will not detect a failure of any switches, mixers, or bond wire connections used in the 77 GHz pulse Doppler radar circuit. In order to test any of these components, additional detector circuits need to be incorporated into the system for each component that is to be monitored. Obviously, this increases the complexity of the circuit greatly, and as a result, also increases the cost of the system.

SUMMARY OF THE INVENTION

The present invention provides an improved fault detection system for a 77 GHz pulse Doppler radar sensor circuit. It accomplishes the fault detection process without the necessity of additional components such as detector diodes or detector circuits.

In a preferred embodiment, the present invention uses a novel configuration of the MMIC switch that is already present in the 77 GHz pulse Doppler radar sensor to perform the fault detection process. The MMIC switch is configured in a manner that allows for the testing of the input oscillator, mixer, bond connections, antenna connections and the switch itself.

The preferred embodiment of the present invention enables the 77 GHz pulse Doppler radar sensor to be tested by configuring the MMIC switch into two test mode configurations. Each configuration is used to test certain elements of the 77 GHz pulse Doppler radar sensor.

The first configuration tests all of the elements of the circuit with the exception of those associated with the antenna, namely the antenna switches and antenna bond wires. In this configuration, both the transmit (TX) and receive (RX) switches contained within the MMIC switch are closed. In addition, all of the switches to the antenna are open, so that none of the input signal is actually transmitted. This allows for the input signal from the 77 GHz oscillator to pass through the MMIC switch and reach both outputs of the MMIC switch at the same frequency with a phase difference of approximately 0 or 180 degrees. The two outputs from the MMIC switch become the inputs to a mixer. In this configuration, the mixer operates as an amplitude detector. By combining the two signals in the mixer, a DC output is achieved if the circuit is operating properly. If a DC output is not achieved at the mixer output, a fault has occurred within the circuit.

The second test mode configuration of the MMIC switch tests the antenna switches and associated bond wires. In this configuration, the RX switch is closed and the TX switch is opened. This reduces the amount of signal that reaches the antenna switches, but does not eliminate it entirely as a result of signal leakage across the TX switch. Each antenna switch is then individually modulated, while all other antenna switches in the circuit are opened. The outputs from the MMIC switch are provided to the mixer in a similar fashion to that of the first test mode configuration. The mixer output will show a modulation if the particular antenna switch being modulated is functioning properly. This process is repeated for each antenna switch to assure that they are all in working order.

DETAILED DESCRIPTION OF THE INVENTION

Figure 1:
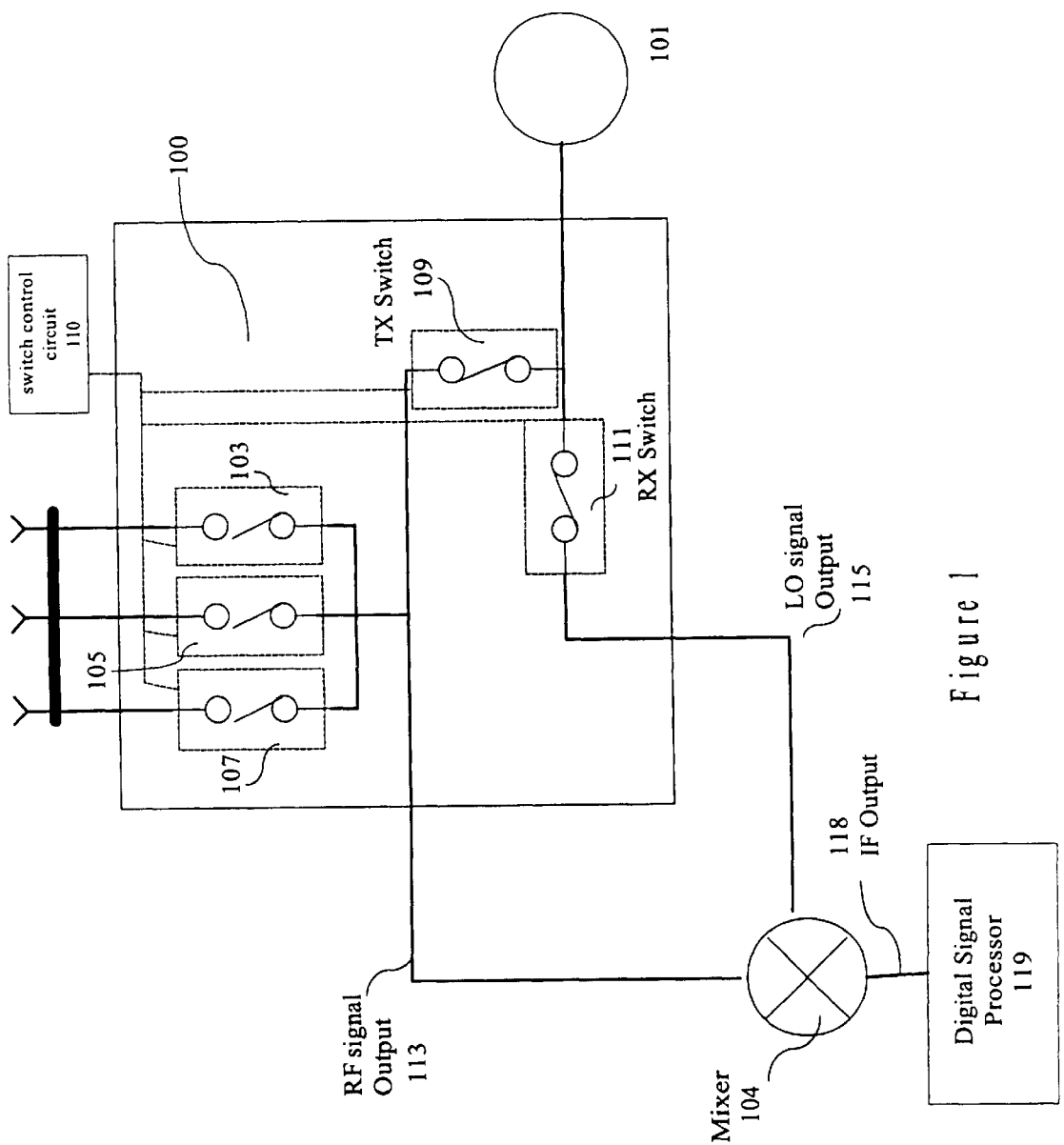
FIG. 1 illustrates a 77 GHz pulse Doppler radar circuit using a MMIC switch configuration in accordance with the present invention for testing the circuit without testing the antenna switches or associated bond wires.

The 77 GHz pulse Doppler radar system operates by transmitting a short burst of energy into one or more beam feeds of an antenna and receiving these signals as they are reflected off of objects. An oscillator circuit 101 is used to generate two input signals to the 77 GHz pulse Doppler radar system. A first input signal is generated at a frequency of 77 GHz to provide the signal that will be transmit through the system antenna switches. The system also uses a second input signal referred to as the local oscillator signal. During the receive mode, this signal is normally set to a frequency 180 MHz lower than the first input signal and provides the input signal when transmission is not occurring. These two input signals combine to provide a constant input to the 77 GHz pulse Doppler radar system.

During standard operation, the system cycles between a transmit mode and a receive mode. During the transmit mode, the input from the 77 GHz oscillator 101 is applied to a MMIC switch 100. The MMIC switch is used to distribute the signal to the various sections of the antenna in the transmit mode. This is achieved by using a series of switches within the MMIC switch 100 which are controlled by a switch control circuit 110. Various types of switch control circuitry can be used, and such circuits are well known in the art. In the standard operating mode, the antenna switches (103, 105, 107) are each closed at predetermined intervals, allowing the signal to be transmit from each antenna feed at the desired times. The signal travels outward until it strikes an object and is reflected back to the antennas. The reflected signal provides the RF output signal 113 from the MMIC switch 100.

Once a 77 GHz pulse is sent through the TX switch 109 for transmission from the antennas, the input is switched from the 77 GHz input frequency to the local oscillator frequency. In this state, the system is in the receive mode. Within the MMIC switch 100, the path of the input signal is changed. The local oscillator frequency signal is routed through the MMIC switch 100 to the LO Signal output 115. This is accomplished by opening the TX switch 109 while simultaneously closing the RX switch 111. This causes the input signal from the local oscillator to pass through the MMIC switch to the LO signal output 115.

The LO signal output 115 and the RF signal output 113 are provided to the mixer 104. The mixer 104 mixes the two signals and creates an output signal 118 at an intermediate frequency (IF). From this signal, the system can determine the distance and velocity of the object relative to the sensor using a digital signal processor 119. By using the digital signal processor 119 to process the signals from each pulse, the location of objects within the range of the system is determined.

The present invention uses the existing components in the 77 GHz pulse Doppler pulse radar system to provide a fault detection test for the sensor circuit. In order to accomplish this, two separate, non-standard configurations of the MMIC switch 100 are used. During normal operations, the TX switch 109 and the RX switch 111 operate as complements to one another. This means that when one of these switches is in the open position, the other is in the closed position. This allows the pulse from the 77 GHz input signal to be sent to the antenna switches during the transmit mode, and a signal at the local oscillator frequency to be sent to the LO signal output 115 during the receive mode. In the preferred embodiment of the present invention, however, two additional modes, known as the test mode one and test mode two, are created.

In test mode one, the MMIC switch 100 is configured internally as shown in FIG. 1. The TX switch 109 and the RX switch 111 are both closed simultaneously. This configuration allows the input signal from the 77 GHz source to be provided to both the RF signal output and the LO signal output at the same time. The antenna switches 103, 105, 107 are all opened. This prevents any of the input signal from being transmitted or received. As a result, the entire signal passing through the TX switch 109 is routed to the RF Signal output 113. By simultaneously closing TX switch 109 and RX switch 111 while keeping all of the antenna switches open, the MMIC switch 100 provides a signal of the same frequency (77 GHz) to the mixer on both the RF signal output and the LO signal output simultaneously. However, the two signals are not identical. They each have a approximate difference in phase of either 0 or 180 degrees. A difference in phase results from the different path lengths each signal travels from the oscillator to the mixer. Because one signal travels a longer path length from the oscillator to the mixer, the phases of the signals are offset. The path lengths are calibrated such that the resulting phase difference is either 0 degrees or 180 degrees. This phase differential enables the fault detection process to be performed by the mixer.

The mixer functions as an amplitude detector when the MMIC switch is in test mode one as described above. The mixer combines the two signals of the same frequency but different phases and produces an output at the IF output node 118. The signals are combined in a manner to provide an output signal equal to the difference between the input signals. In other words, the mixer subtracts one signal from the second signal of equal frequency but offset in phase. The result of this process will be a constant DC voltage output.

Obtaining a constant DC voltage output on the IF output node 118 indicates that the internal switches of the MMIC switch as well as the 77 GHz input oscillator and any bond wires associated with these components are functioning properly. If the expected output is not achieved on the IF output 118, a fault has occurred within the system and the user can be alerted that the system is not functioning properly. Thus, the user is informed not to rely on the information concerning the location of potential hazards to the vehicle, or lack thereof.

The same process also can be used to assure that the frequency tuning of the input oscillator is functioning properly. A signal from at the local oscillator frequency is applied to the input node of the MMIC switch in the same manner as described above using the 77 GHz signal and the resulting output will again be a constant DC voltage. This assures that the frequency tuning of the input oscillator is functioning.

Configuring the MMIC switch in test mode one configuration as shown in FIG. 1 will allow detection of the existence of faults in the input oscillators or within the MMIC switch. However, when the MMIC switch is configured as shown in FIG. 1, the system antenna switches are open and thus isolated from the circuit. Thus, a problem with the antenna, antenna switches, or any bond wires associated with the antenna switches will go undetected.

Figure 2:
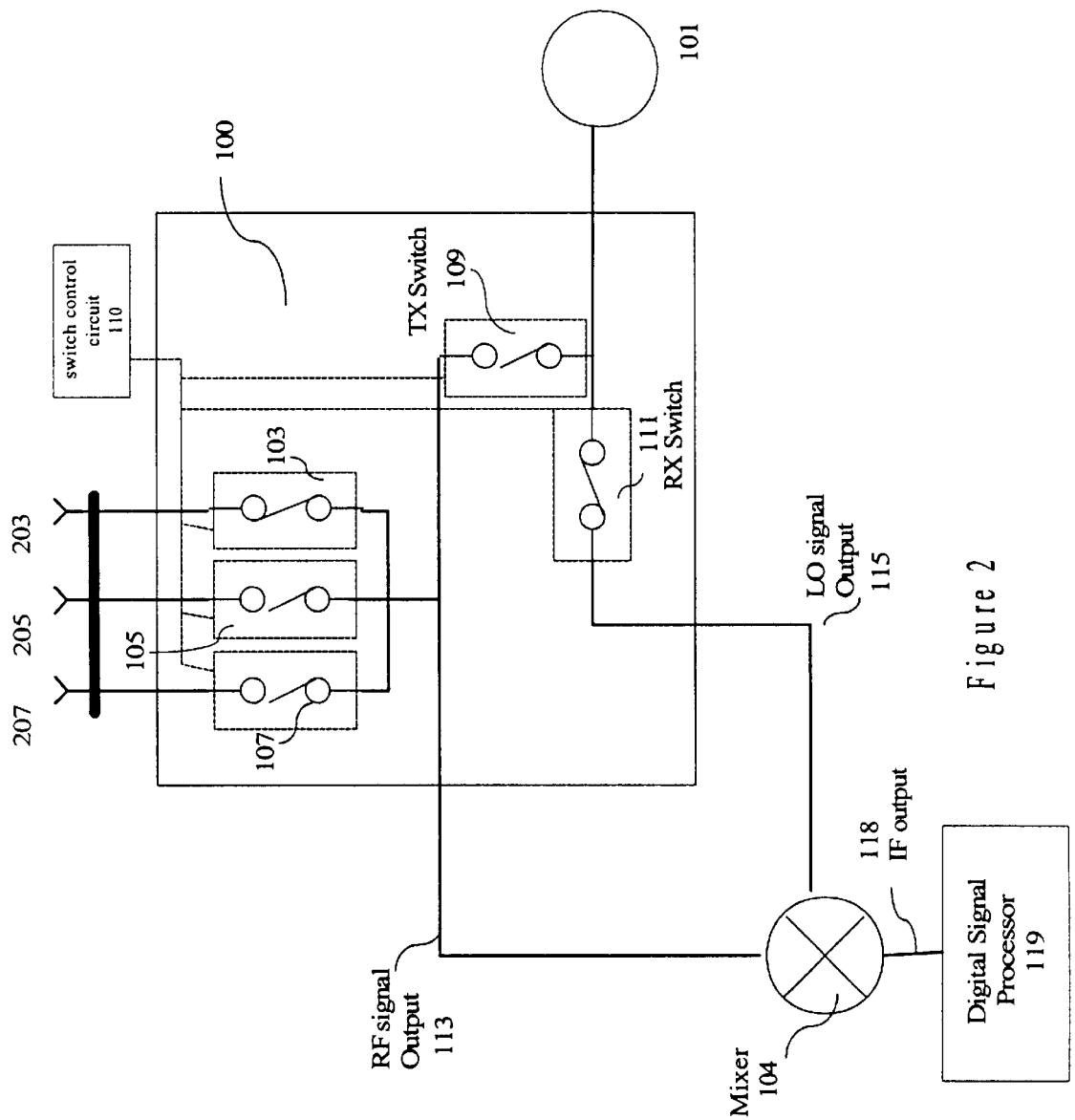
FIG. 2 illustrates a 77 GHz pulse Doppler radar circuit using a MMIC switch configuration in accordance with the present invention for testing the antenna switches and associated bond wires.

In order to detect a problem with an antenna or an antenna bond wire, the MMIC switch is configured into the test mode two configuration. This configuration is shown in FIG. 2. In this mode, the TX switch 109 is opened while the RX switch 111 remains closed. By opening the TX switch 109, the signal level provided to the antenna switches is reduced. However, the signal is not eliminated completely. The nature of the MMIC switch 100 is such that an open configuration on TX switch 109 will allow for a low level leakage of the input signal across the switch. The resulting signal along the transmission path is reduced approximately 20 dB to 30 dB from the level realized when the TX switch is closed.

When the MMIC switch is set in this configuration, it becomes possible to test the antenna switches. Each antenna switch is tested individually. In the preferred embodiment shown in FIG. 2, the system uses three separate antenna switches to feed various sections of the antenna. This enables the system to observe three distinct paths in front of the vehicle. However, the testing method described herein could be applied to any number of antenna switches contained within the system.

To perform a check on the right hand feed 203 of the antenna and the associated bond wires, the remaining antenna switches (105 and 107) are opened in order to isolate these antennas. The signal on the transmission path will now only be applied across antenna switch 103.

To perform the actual testing process, the antenna switch 103 is modulated between the opened and closed states in a consistent pattern. By modulating the antenna switch 103 between the open and closed positions, the RF signal output 113 will have a corresponding modulation in signal intensity. This is created as a result of the entire signal along the transmission path reaching the RF signal output 113 when the antenna switch 103 is in the open position, but a lower level reaching the RF signal output 113 when the switch 103 is in the closed position because a portion of the signal is transmitted via the antenna.

The constant signal from the LO signal output 115 and the varying signal from the RF signal output 113 are applied to the mixer 104. The mixer operates in the same manner as described above for test mode one. The two input signals are combined and the resulting output is provided at the IF output node 118. When the MMIC switch is configured in the test mode two configuration, the signal at the IF output node 113 should modulate in accordance with the pattern of modulation applied to the antenna switch 103 that is the subject of the test. If the output at the IF output 113 is a constant, non-modulating signal, a fault has occurred with the tested antenna switch or with the bond wires associated with this antenna switch. If the output signal at the IF output 113 modulates in accordance with the modulation in pattern applied to the antenna switch 103, the antenna switch and its associated bond wires are all functioning properly.

To complete the testing process, the modulation process is applied to each antenna switch in the system. For example, to test antenna switch 105 and any bond wires associated with this component, the remaining antenna switches (103 and 107) are isolated by opening and the testing process described above is repeated. Once each antenna switch has been modulated with all other antenna switches in the isolated state, the testing of the antennas switches and associated bond wires is complete.

Using the two test mode configurations as described above enables the user to determine if all of the elements contained within the system are functioning as desired. In addition, it can be determined if the fault lies in a particular antenna path or somewhere in either the MMIC switch or input oscillator. It is not possible to determine whether the fault lies in the MMIC switch or the input oscillator after a test is conducted using test mode one. However, this is normally not of great concern as the purpose of the test is primarily to determine if the system is functioning properly. If it is necessary to have the ability to determine the location of the fault after a failure is detected, a detector diode or additional detector circuitry could be used in conjunction with the present invention. One advantage of the present invention, however, is that no such additional components are required to determine if the system is operational.

A 77 GHz pulse Doppler radar system that has the ability to detect faults that prevent the system from functioning properly provides a significant advantage over systems used in the prior art. A great safety risk can arise from a user relying upon a system which is not functioning properly, and confusing a non-functioning system with a system that is reporting an absence of potential hazards can have disastrous results. The system in accordance with the present invention removes this concern. It is envisioned that the system in accordance with the present invention could be designed to allow the user to manually perform the testing process when desired, or to have the testing process performed automatically at a given time or interval (i.e., upon starting the vehicle).

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

We claim:

1. A method for testing a pulse Doppler radar sensor circuit comprising at least one antenna, and a switch circuit, said switch circuit comprising a first switch coupled between an input terminal and a first output terminal, a second switch coupled between said input terminal and a second output terminal, and at least one third switch, each said at least one third switch coupled between said second switch and one of said at least one antennas, said method comprising the steps of:

1) configuring said switch circuit such that a first path between said input terminal and said first output terminal and a second path between said input terminal and said second output terminal introduce different phase delays to an input signal;
   2) configuring said switch circuit such that said first switch and said second switch are both closed and said each said third switch is open;
   3) providing an input signal to said switch circuit at said input terminal; and
   4) comparing a signal at said first output terminal and a signal at said second output terminal to determine if said first path, second path, first switch, and second switch are functioning.

2. A method as set forth in claim 1, wherein said switch circuit comprises a MMIC.

3. A method as set forth in claim 1, wherein step 1 comprises configuring said first path and said second path to have different lengths.

4. A method as set forth in claim 1, wherein step 4 comprises detecting a phase difference between said signal at said first output terminal of said switch circuit and said signal at said second output terminal of said switch circuit.

5. A method as set forth in claim 4, wherein step 4 comprises the steps of:
 4.1) combining said first output signal and said second output signal to produce a combined output signal;
 4.2) comparing said combined output signal to predefined expected results.

6. A method as set forth in claim 5, wherein said pulse Doppler radar sensor circuit further comprises a mixer having a first input terminal coupled to said first output terminal of said switch circuit and a second input terminal coupled to said second output terminal of said switch circuit and an output terminal, wherein step 4.1 is performed by said mixer.

7. A method as set forth in claim 6, wherein the step 4.2 is performed by a signal processor.

8. A method as set forth in claim 1, wherein the input source provides an input signal with a frequency of 77 GHz.

9. A method as set forth in claim 1, further comprising the steps of:
 5) configuring said switch circuit such that said first switch is closed and said second switch is open, wherein a leakage signal will travel across said second switch along said second path, said leakage signal of less magnitude than said input signal;
 6) selecting one at least one third switch;
 7) opening each unselected at least one third switch;
 8) providing an input signal to said switch circuit at said input terminal;
 10) modulating said selected at least one third switch between open and closed; and
 11) comparing a signal at said first output terminal and a signal at said second output terminal to determine if said selected at least one third switch and said at least one antenna coupled to said selected third switch are functioning.

10. A method as set forth in claim 9 further comprising the step of
 12) successively selecting a next one of said at least one third switches and repeating step 7 through step 10 for each of said at least one third switches.

11. A method as set forth in claim 9, wherein said switch circuit comprises a MMIC.

12. A method as set forth in claim 9, wherein said step 1 comprises configuring said first path and said second path to have different lengths.

13. A method as set forth in claim 9, wherein step 4 comprise the steps of:
 4.1) combining said first output signal and said second output signal in a mixer to produce a combined output signal;
 4.2) comparing said combined output signal to predefined expected results.

14. A method as set forth in claim 9, wherein step 11 comprise the steps of:
 11.1) combining said first output signal and said second output signal in a mixer to produce a combined output signal;
 11.2) comparing said combined output signal to predefined expected results.

15. A method as set forth in claim 13, wherein step 4.2 is performed using a signal processor.

16. A method as set forth in claim 14, wherein step 11.2 is performed using a signal processor.

17. A method as set forth in claim 9, wherein the input source provides an input signal with a frequency of 77 GHz.

18. A method for testing a pulse Doppler radar sensor circuit comprising at least one antenna, and a switch circuit, said switch circuit comprising a first switch coupled between an input terminal and a first output terminal, a second switch coupled between said input terminal and a second output terminal, and at least one third switch, each said at least one third switch coupled between said second switch and one of said at least one antennas, said method comprising the steps of:
 1) configuring said switch circuit such that a first path between said input terminal and said first output terminal and a second path between said input terminal and said second output terminal introduce different phase delays to an input signal;
 2) configuring said switch circuit such that said first switch is closed and said second switch is open, wherein a leakage signal will travel across said second switch along said second path, said leakage signal of less magnitude than said input signal;
 3) selecting one at least one third switch;
 4) opening each unselected at least one third switch;
 5) providing an input signal to said switch circuit at said input terminal;
 6) modulating said selected at least one third switch between open and closed; and
 7) comparing a signal at said first output terminal and a signal at said second output terminal to determine if said selected at least one third switch and said at least one antenna coupled to said selected third switch are functioning.

19. A method as set forth in claim 18 further comprising the step of:
 8) successively selecting a next one of said at least one third switches and repeating step 4 through step 7 for each of said at least one third switches.

20. A method as set forth in claim 18, wherein said switch circuit comprises a MMIC.

21. A method as set forth in claim 18, wherein said step 1 comprises configuring said first path and said second path to have different lengths.

22. A method as set forth in claim 18, wherein said step 7 comprises the steps of:
 7.1) combining said first output signal and said second output signal to produce a combined output signal;
 7.2) comparing said combined output signal to predefined expected results.

23. A method as set forth in claim 22, wherein said pulse Doppler radar sensor circuit further comprises a mixer having a first input terminal coupled to said first output terminal of said switch circuit and a second input terminal coupled to said second output terminal of said switch circuit and an output terminal, and wherein step 7.1 is performed by said mixer.

24. A method as set forth in claim 22, wherein step 7.2 is performed by a signal processor.

25. A method as set forth in claim 18, wherein the input source provides an input signal with a frequency of 77 GHz.

26. A circuit for testing the functionality of components in a pulse Doppler radar sensor circuit having at least one antenna, comprising:
 a mixer having a first input and a second input and an output terminal;

a switch circuit, said switch circuit comprising a first switch coupled between an input terminal and said first input of said mixer, a second switch coupled between said input terminal and said second input of said mixer, and at least one third switch, each said at least one third switch coupled between said second switch and one of said at least one antenna;

a control circuit for controlling said switches to place them in a condition in which said first switch is closed, said second switch is closed, and said at least one third switch is open; and a processor coupled to said output terminal of said mixer, said processor configured to determine whether a signal at said mixer output indicates a phase difference between said signal at said first and second inputs of said mixer.

27. A method as set forth in claim 26, wherein said switch circuit comprises a MMIC.

28. A circuit as set forth in claim 26, wherein said input signal received by said switch circuit is a 77 GHz signal.

29. A pulse Doppler radar sensor circuit comprising:

at least one antenna, and said circuit for testing set forth in claim 26.

30. A circuit for testing the functionality of all components in a pulse Doppler radar sensor circuit having at least one antenna, comprising:

a mixer having a first input and a second input and an output terminal;

a switch circuit, said switch circuit comprising a first switch coupled between an input terminal and said first input of said mixer, a second switch coupled between said input terminal and said second input of said mixer, and at least one third switch, each said at least one third switch coupled between said second switch and one of said at least one antenna;

a control circuit for controlling said switches to place them in a condition in which said first switch is closed, said second switch is open, exactly one of said at least one third switch is capable of modulating between open and closed upon command, and each of said remaining at least one third switch is open; and a processor coupled to said output terminal of said mixer, said processor configured to determine whether a signal at said mixer output indicates a phase difference between said signal at said first and second inputs of said mixer.

31. A method as set forth in claim 30, wherein said switch circuit comprises a MMIC.

32. A circuit as set forth in claim 30, wherein said input signal received by said switch circuit is a 77 GHz signal.

33. A pulse Doppler radar sensor circuit comprising:

at least one antenna; and said circuit for testing set forth in claim 30.

* * * * *